United States Patent
Rice et al.

(10) Patent No.: US 8,545,072 B2
(45) Date of Patent: Oct. 1, 2013

(54) OPTIC EMITTING A SIMULATED FLOATING BAND OF LIGHT

(75) Inventors: Lawrence M. Rice, Hillsboro, NH (US); Thomas Tessnow, Weare, NH (US)

(73) Assignee: OSRAM SYLVANIA Inc., Danvers, MA (US)

( * ) Notice: Subject to any disclaimer, the term of this patent is extended or adjusted under 35 U.S.C. 154(b) by 329 days.

(21) Appl. No.: 13/068,124

(22) Filed: May 3, 2011

(65) Prior Publication Data

US 2012/0281425 A1    Nov. 8, 2012

(51) Int. Cl.
*F21V 7/06*    (2006.01)

(52) U.S. Cl.
USPC ...... 362/517; 362/518; 362/298; 362/296.08; 362/346

(58) Field of Classification Search
USPC ....... 362/516–518, 296.05–296.08, 298–305, 362/346, 347
See application file for complete search history.

(56) References Cited

U.S. PATENT DOCUMENTS

| | | | | |
|---|---|---|---|---|
| 4,791,534 A | * | 12/1988 | Lindberg | 362/516 |
| 6,674,096 B2 | | 1/2004 | Sommers | |
| 7,134,774 B2 | | 11/2006 | Iwasaki | |
| 7,178,960 B2 | * | 2/2007 | Ishida | 362/298 |
| 7,213,944 B2 | * | 5/2007 | Shimaoka et al. | 362/299 |
| 7,563,008 B2 | | 7/2009 | Chinniah et al. | |
| 8,197,109 B2 | * | 6/2012 | Iwasaki | 362/517 |
| 2008/0273344 A1 | * | 11/2008 | Arlon | 362/516 |

* cited by examiner

*Primary Examiner* — Bao Q Truong
(74) *Attorney, Agent, or Firm* — Edward S. Podszus (57) ABSTRACT

An optic includes an LED light source inside a primary reflector, where the primary reflector includes a parabolic trough whose interior surface has a longitudinally extending parabolic first reflective surface that receives light from the light source and emits a fan-shaped beam of light. The LED light source includes an LED die mounted so as to be at or near a focus of the parabolic trough. A selectively shaped secondary reflector is spaced from the primary reflector and has a second reflective surface that is arranged to intersect and reflect the fan of light. The size and shape of the second reflective surface corresponds to the fan of light where the second reflective surface intersects the fan of light. The second reflective surface displays a band of light that appears disassociated from a particular physical surface so as to float in space.

16 Claims, 7 Drawing Sheets

FIG. 1A

VIEWER

OPTIC EMITTING A SIMULATED FLOATING BAND OF LIGHT

BACKGROUND

An optic uses a reflector to direct light from a light source in a particular direction. Such optics are used in a variety of lighting applications.

U.S. Pat. No. 6,674,096 (Sommers) discloses a die-level encapsulated LED package. An LED die is encapsulated in resin and mounted on a lead frame that includes a non-parabolic reflective surface. Light from the die is directed to an interior curved surface of the resin that further reflects the light inside the resin to an external surface of the resin. The reflecting surfaces cooperate to convert light from the LED die to light that appears to come from a point or line near the curved surface of the resin, as shown in FIG. 3 therein.

SUMMARY

A novel optic emits a selectively shaped band of light that appears disassociated from a particular physical surface so to "float" in space. The novel optic includes a light source inside a primary reflector, where the primary reflector includes a parabolic trough whose interior surface has a longitudinally extending parabolic reflective surface that receives light from the light source. The primary reflector emits a fan-shaped beam of light that includes light reflected from the reflective surface and light directly from the light source. The fan-shaped beam of light is intersected by a selectively shaped secondary reflector that displays the floating band of light. The novel optic is adaptable to a variety of applications, such as automobile lamps.

A novel method of making this optic is also disclosed.

The novel optic and method present advantages that will be apparent to those of skill in the art after consideration of the following drawings and description of preferred embodiments.

DESCRIPTION OF PREFERRED EMBODIMENTS

Figure 1A:
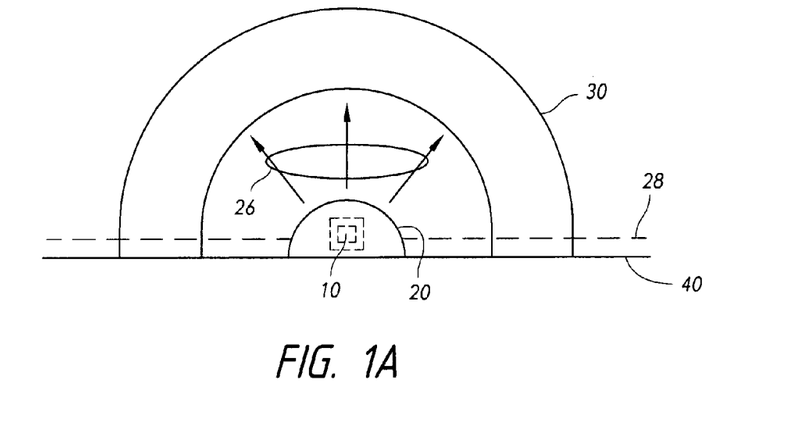
FIGS. 1*a-b* are schematic representations of a preferred embodiment.
Figure 1B:
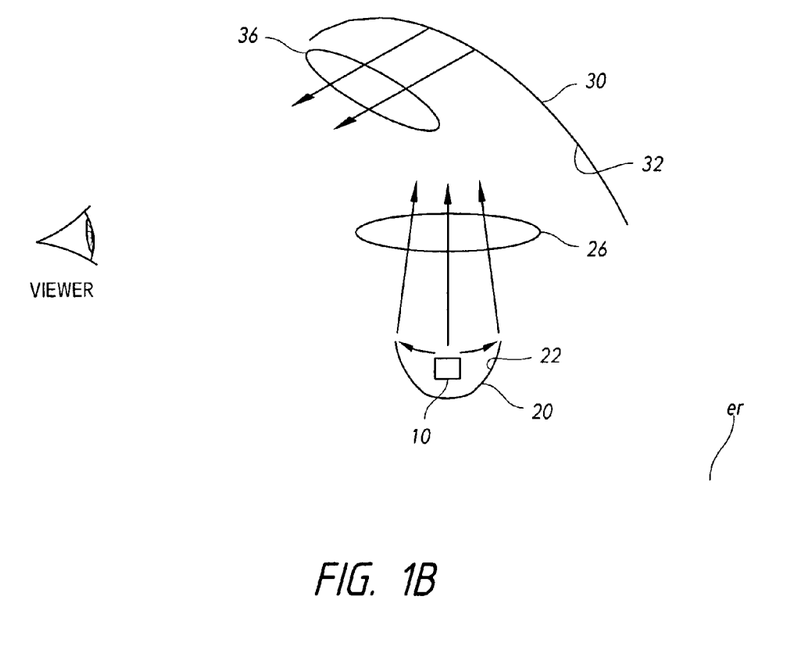

With reference now to FIGS. 1*a-b*, one embodiment includes a light source 10 that includes a light emitting diode (LED), a primary reflector 20, and a secondary reflector 30. The light source 10 is within the primary reflector 20 and emits light that is reflected from an interior first reflective surface 22 of the primary reflector 20 toward a second reflective surface 32 of the secondary reflector 30. Light from the primary reflector is a fan-shaped beam of light 26 that extends radially from the primary reflector. The fan-shaped beam of light 26 includes light reflected from first reflective surface 22 and light directly from light source 10. The radial extent and thickness of the fan-shaped beam of light 26 are defined by dimensions of the primary reflector 20. For example, the radial extent of the fan-shaped beam of light 26 is defined by a height of end walls of the primary reflector 20 and the thickness is defined by a height and shape of the sides of the primary reflector (see also discussion of FIGS. 3*a-c* below). The primary and secondary reflectors are arranged in fixed positions relative to each other, such as on a substrate or housing 40, so that the second reflective surface 32 intersects and reflects the fan-shaped beam of light 26. The secondary reflector 30 displays the reflected light in a band of light 36 that appears disassociated from a particular surface so as to float in space; that is, no source of light is visible since the light source 10 is within the primary reflector 20 out of a direct line of sight from the viewer (e.g., the viewer being to the left of FIG. 1*b*.)

Figure 2A:
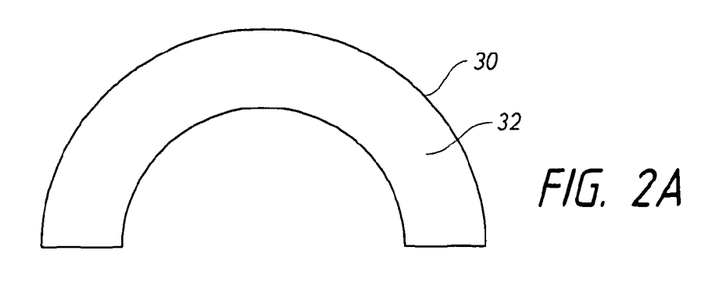
FIGS. 2*a-d* are pictorial representations of embodiments of the secondary reflector.
Figure 2B:
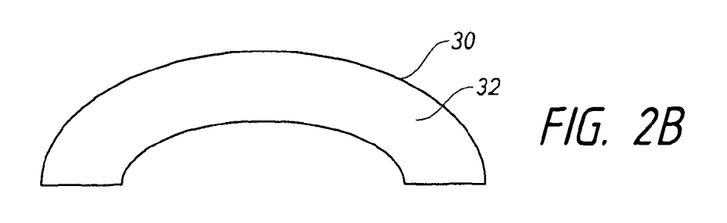
Figure 2C:
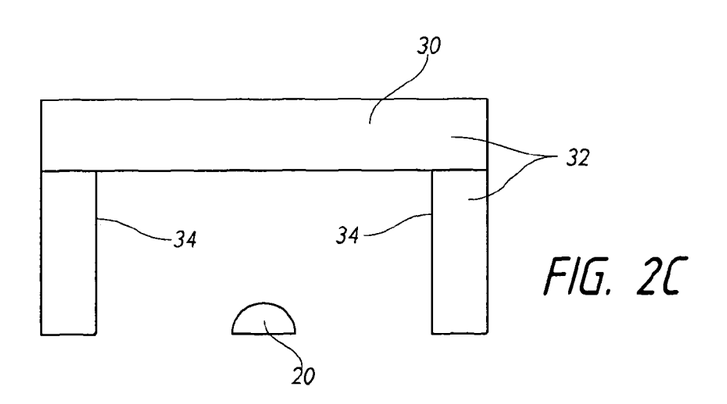

As shown in FIGS. 2*a-d*, the secondary reflector 30 has a size and shape appropriate for its use. That is, the size and shape of the second reflective surface 32 of secondary reflector 30 is defined by the desired size and shape of the band of light 36 to be emitted by the optic. In cross section, the secondary reflector 30 may be shaped to reflect the fan of light in a direction generally perpendicular to the direction of the fan of light (out of the page with FIG. 1*a*), and to this end the cross section may be parabolic. With reference again to FIG. 1*a*, the second reflective surface 32 may include two opposing portions that each extends beyond a respective longitudinal end of the primary reflector 20 so that an imaginary line 28 extending longitudinally through the primary reflector (e.g., through the light source 10) intersects the two opposing portions. In exemplary embodiments, the band of light, and thus the second reflective surface 32, may, in a front view, be part of a circle (FIG. 2*a*), ellipse (FIG. 2*b*), or other curved geometric figure. In yet a further embodiment, a compound optic may be provided that includes at least one of the optics described herein and two further secondary reflectors 34, where the secondary reflector 30 and the further secondary reflectors 34 are each substantially linear and arranged in a U shape (e.g., a "fireplace" appearance as in FIG. 2*c*), or other suitable combinations. In the embodiment of FIG. 2*c*, the light source 10 and primary reflector 20 may illuminate the further secondary reflectors 34, or additional lights sources and primary reflectors may be provided to illuminate the respective further secondary reflectors.

Figure 2D:
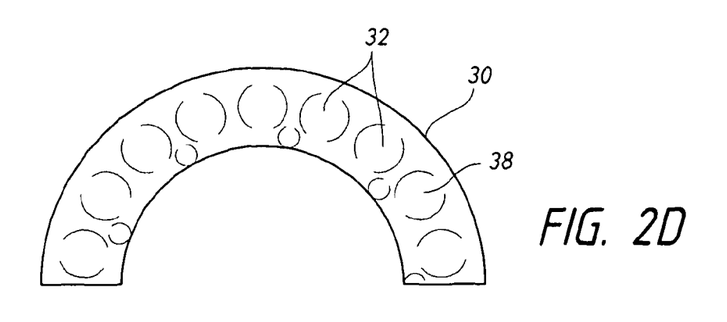

As shown in FIG. 2*d*, the second reflective surface 32 of the secondary reflector 30 may include further diverse reflective surfaces, such as a fluted arrangement with a multiplicity of scalloped depressions or mounds 38 that may be in rows and columns (see also FIGS. 6*a-e*).

While the size and shape of the second reflective surface 32 may be substantially coextensive with the fan-shaped beam of light 26 to provide an efficient use of the available light, such coextensiveness is not required as some portions may be unlit for aesthetic reasons. It is suggested that the coextensiveness be such that at least 75% of the second reflective surface 32 is directly illuminated by the fan-shaped beam of light 26 and at least 75% of the light from the light source 10 directly or indirectly impinges on the second reflective surface.

Figure 3A:
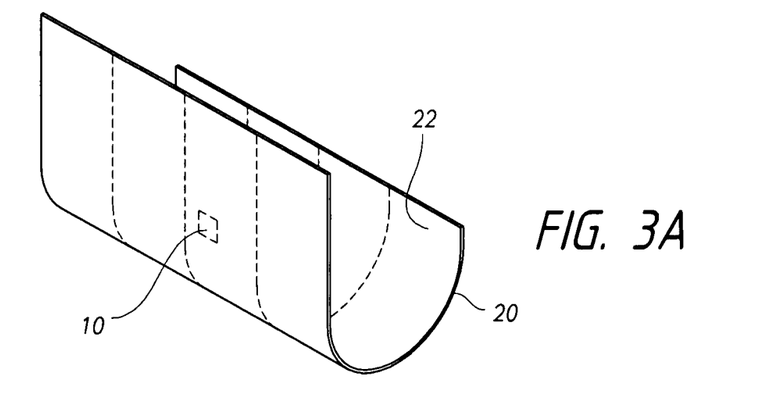
FIGS. 3*a-c* are pictorial representations of embodiments of the primary reflector.
Figure 3B:
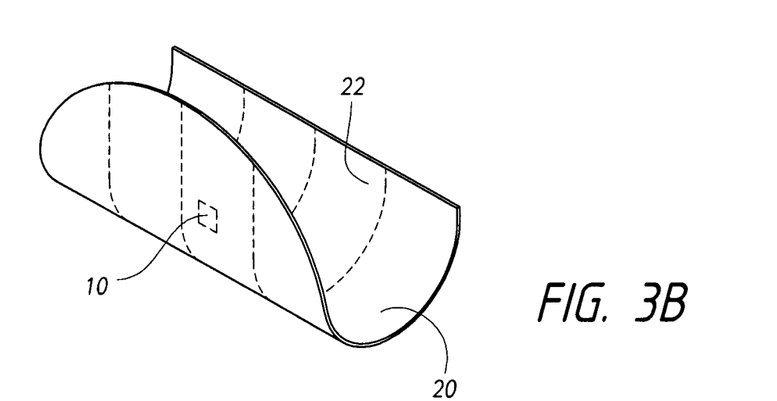
Figure 3C:
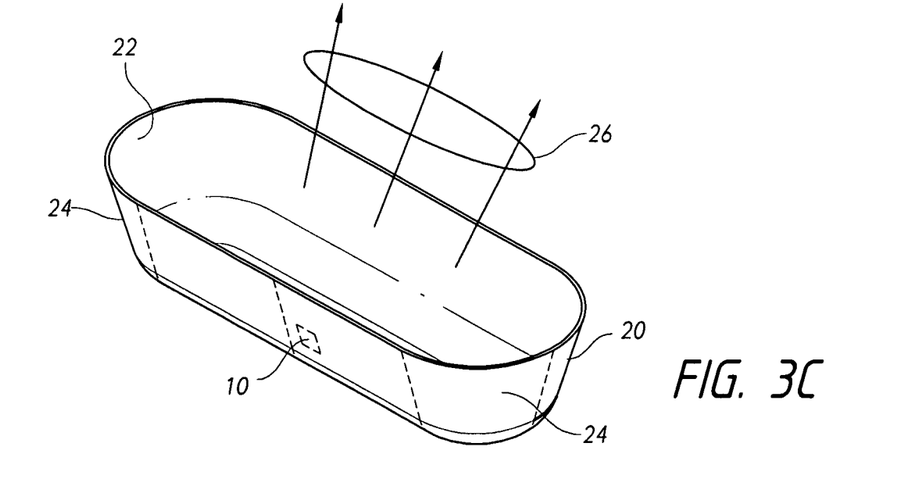

As shown in FIGS. 3*a-c*, the primary reflector 20 desirably is a parabolic trough whose first reflective surface 22 includes a longitudinally extending parabolic reflective surface. A parabolic trough is a three dimensional figure whose sections are parabolas. The sections may be perpendicular to the longitudinal axis, such as shown by the dashed lines in FIG. 3*a*.

In the embodiment shown in FIG. 3b, the parabolic trough is arcuate (e.g., part of a parabola, ellipse, or circle) when viewed in direction perpendicular to the longitudinal axis of the parabolic trough. In a further embodiment, half parabolic end sections 24 may be added to the ends of the parabolic trough, such as shown in FIG. 3c. This embodiment limits the radial extent of the fan of light 26 and permits a more efficient use of light from the light source. The size and shape of the primary reflector 20 is defined by the size and shape of the secondary reflector 30, which as noted above is defined by the size and shape of the band of light 36 that is to be emitted by the particular optic. An alternative embodiment of the parabolic trough is shown in FIGS. 7a-d that depict an alternative primary reflector 21 defined by rotated parabolic sections that extend through a common location on or adjacent to the light source 10.

The light source 10 preferably includes at least one LED die mounted at a focus of a parabola defining the parabolic trough. In this way, the light source 10 is "hidden" within the parabolic trough so that light from the light source does not reach the viewer directly. The first reflective surface 22 of the primary reflector 20 captures and reflects light from the LED die that would normally miss the secondary reflector 30 and directs this light toward the secondary reflector. The LED die may be mounted so that its light also reaches the second reflector directly.

Figure 4:
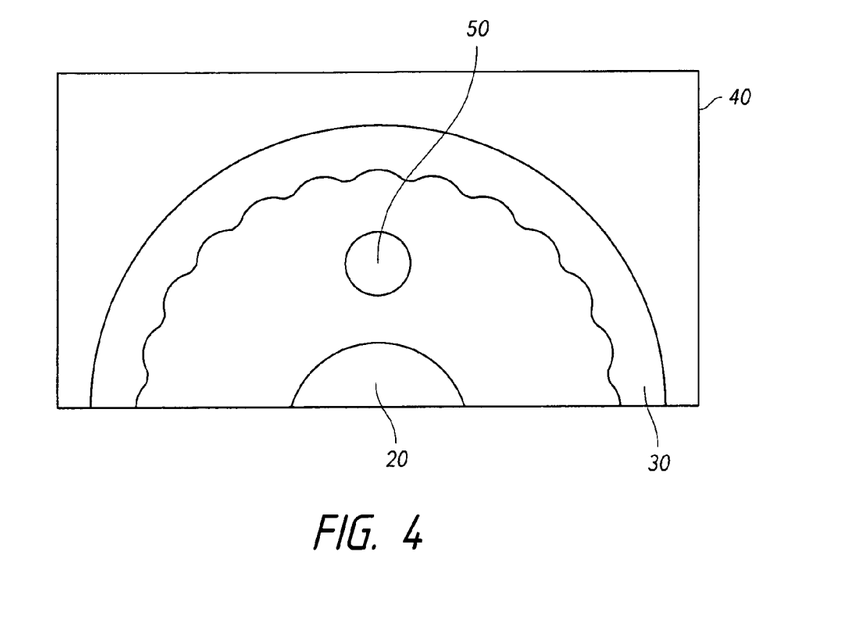
FIG. 4 is a schematic representation of an embodiment suitable for automobile applications.

With reference to FIG. 4, the primary and secondary reflectors 20, 30 may be mounted in the housing 40 that holds them in a fixed spatial relationship. The housing may be conventionally arranged to provide environmental protection for the optic and to be mounted as needed. For example, the housing may be an automobile lamp housing, where the band of light displayed by the secondary reflector functions as a rear or brake light. By way of further example, housing 40 may be coated with a finish that masks its presence (e.g., black) so that the band of light from the optic is made more distinctive, such as for an automobile running, tail, brake or turn light or for a particular interior or exterior embellishment. The optic may be further arranged to provide desired colors for the band of light.

In addition, as depicted in FIG. 4 housing 40 may include an additional light source 50 between the primary and secondary reflectors and that emits light in a direction the same as light reflected from the second reflective surface. The additional light source 50 may be recessed within housing 40 so as to avoid masking light reflected from the primary reflector toward the secondary reflector. In a automobile lamp, the additional light source 50 may have a different color and function than that of the remainder of the optic.

Figure 5:
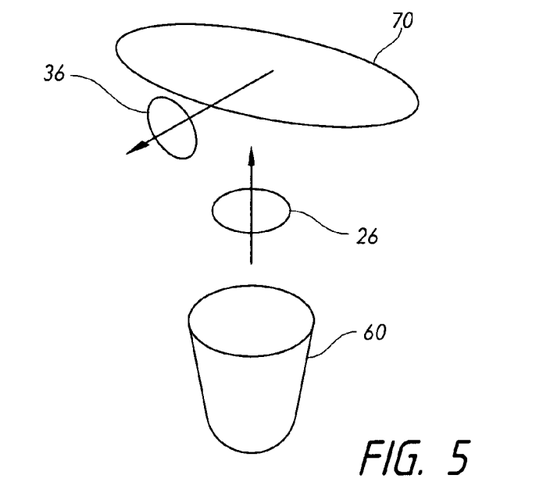
FIG. 5 is a schematic representation of yet a further embodiment.
Figure 6A:
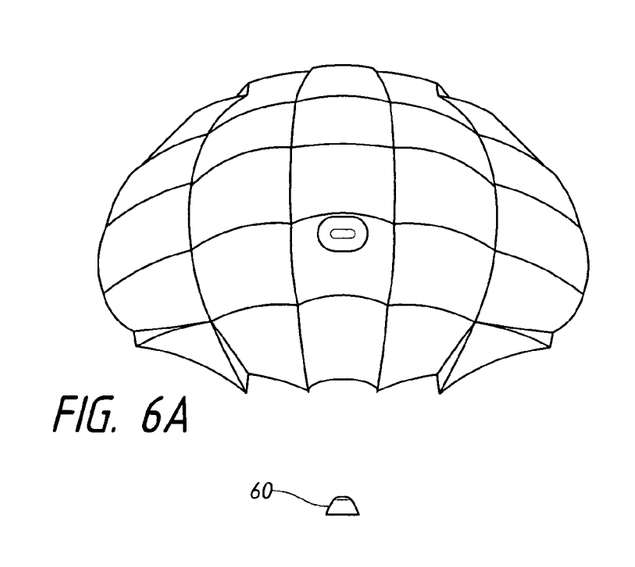
FIGS. 6*a-e* are pictorial representations of a particular arrangement of the embodiment of FIG. 5.
Figure 6B:
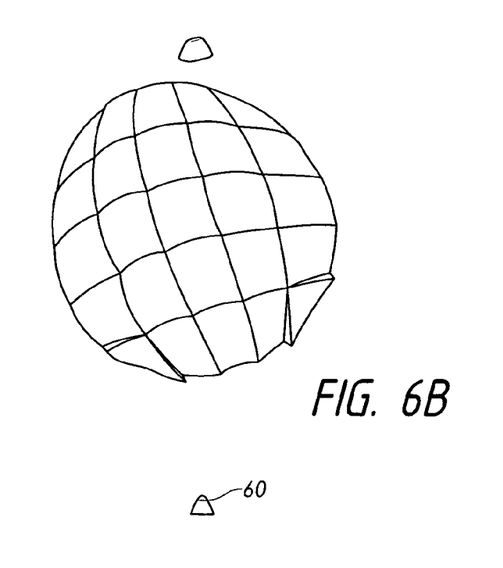
Figure 6C:
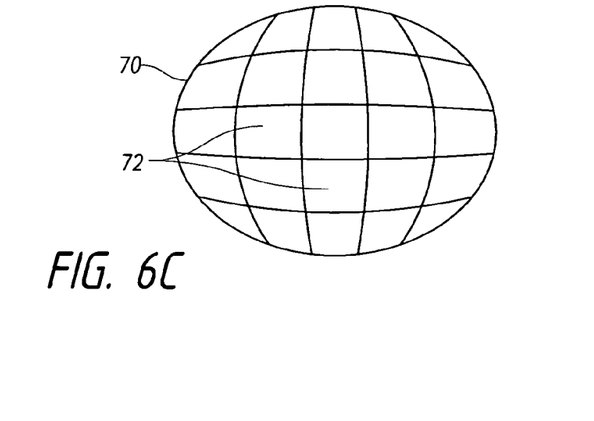
Figure 6D:
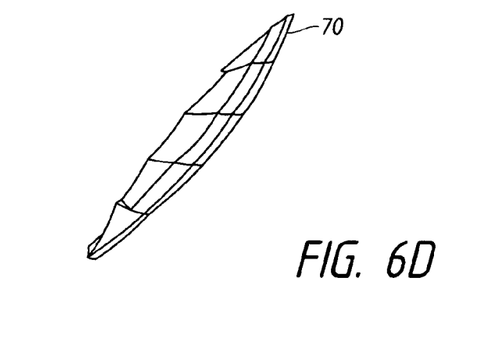
Figure 6E:
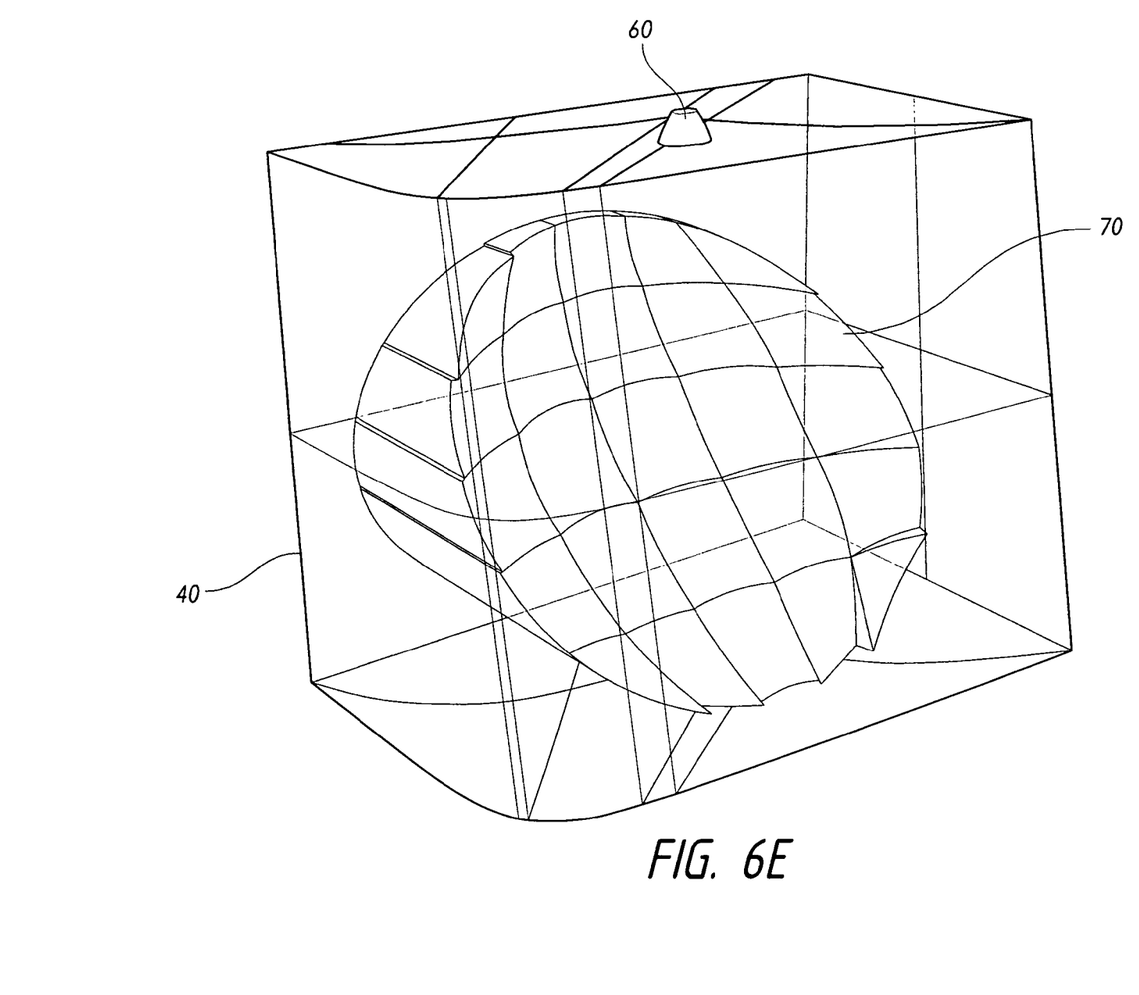
Figure 7A:
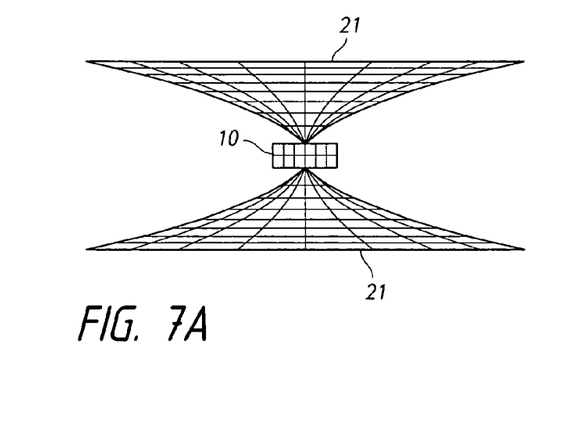
FIGS. 7*a-d* are pictorial representations of an alternative embodiment of the primary reflector.
Figures 7B, 7D:
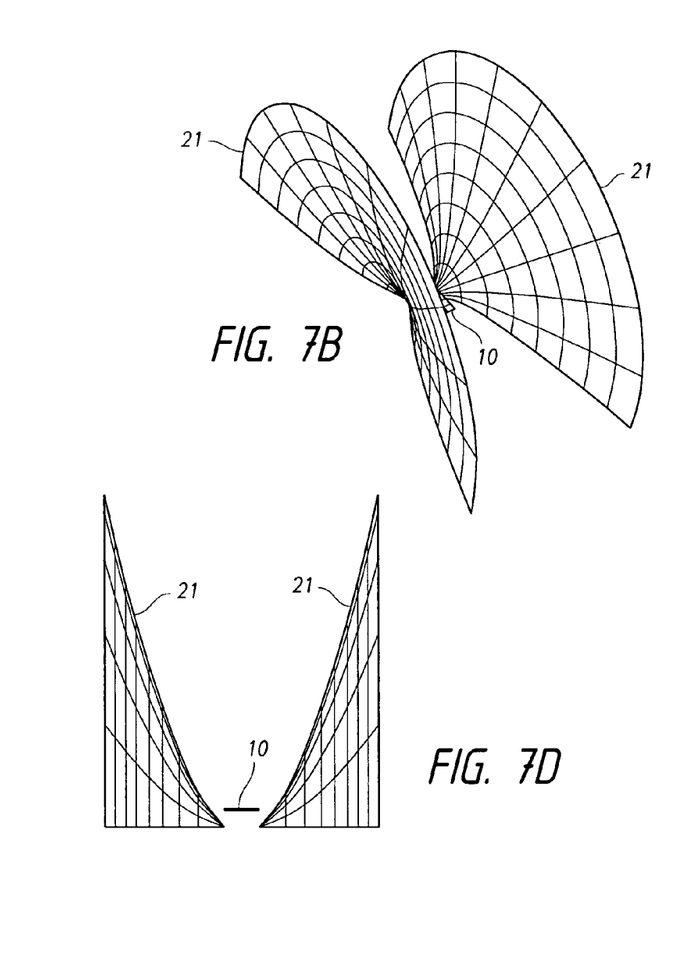
Figure 7C:
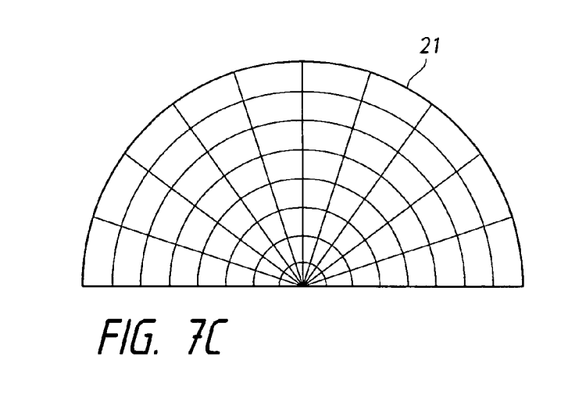

In yet a further embodiment shown in FIG. 5, the primary reflector may be three-dimensional parabola 60, or a series of joined parabolas, that directs a divergent beam of light toward a suitably shaped further secondary reflector 70 that may be part of a parabola.

FIGS. 6a-e show a particular embodiment in which the secondary reflector 70 includes a plurality of scalloped (e.g., parabolic) surfaces 72.

The following is a list of the numbered elements:
10—light source
20—primary reflector
21—alternative primary reflector
22—first reflective surface
24—end sections
26—fan-shaped beam of light
28—imaginary line
30—secondary reflector
32—second reflective surface
34—further secondary reflectors
36—band of light
38—scalloped depressions or mounds
40—housing
50—additional light source
60—three-dimensional parabola
70—further secondary reflector
72—plural scalloped surfaces

We claim:

1. An optic, comprising:
a light source (10) comprising an LED die;
a primary reflector (20) comprising a parabolic trough having an interior surface comprising a longitudinally extending parabolic first reflective surface (22), said light source being mounted inside said primary reflector so that said first reflective surface receives light directly from the light source,
wherein the primary reflector emits a fan-shaped beam of light (26) including light reflected from the first reflective surface and light directly from the light source; and
a secondary reflector (30) spaced from the primary reflector and having a second reflective surface (32) that is arranged to intersect and reflect the fan-shaped beam of light, the second reflective surface having a shape that corresponds to the fan-shaped beam of light,
wherein the second reflective surface displays a band of light (36) whose shape corresponds to the shape of the second reflective surface.

2. The optic of claim 1, wherein the second reflective surface comprises two opposing portions that each extends beyond a respective longitudinal end of said parabolic trough, and wherein an imaginary line (28) extending longitudinally through the parabolic trough intersects said two opposing portions.

3. The optic of claim 1, wherein the second reflective surface is arcuate and substantially coextensive with the fan-shaped beam of light.

4. The optic of claim 1, wherein the second reflective surface comprises a cross section that is generally parabolic.

5. The optic of claim 1, wherein the second reflective surface includes a multiplicity of scalloped depressions or mounds (38).

6. The optic of claim 1, wherein the primary reflector further comprises parabolic surfaces (24) enclosing respective ends of the parabolic trough.

7. The optic of claim 1, wherein the LED light source is at the focus of the parabolic trough.

8. The optic of claim 1, wherein light reflected from the second reflective surface is directed generally perpendicular to light from the primary reflector.

9. The optic of claim 1, wherein the primary reflector is arcuate when viewed in direction perpendicular to the longitudinal direction of said parabolic trough.

10. The optic of claim 1, wherein the parabolic trough (21) is defined by plural parabolic sections that extend through a common location on or adjacent to the light source.

11. A compound optic comprising at least one of the optic of claim 1 and two further secondary reflectors, wherein the secondary reflector (30) and the further secondary reflectors are each substantially linear and arranged in a U shape (34).

12. An automobile light fixture comprising the optic of claim 1, the light fixture further comprising a housing (40) holding the secondary reflector in a fixed spatial relationship with the primary reflector, and wherein the second reflective surface is arranged to function as a lamp for an automobile.

13. The fixture of claim 12, further comprising an additional light source (50) between the primary and secondary reflectors and that emits light in a direction the same as light reflected from the second reflective surface.

14. The fixture of claim 12, wherein the second reflective surface comprises an arch with two diametrically opposed portions that each extends beyond a respective longitudinal end of said parabolic trough, and wherein extensions of the longitudinal axis of the parabolic trough intersect said two diametrically opposed portions.

15. A method of providing a band of light that appears to be disassociated from a physical surface, comprising:

providing a light source (10) comprising an LED die;

providing a primary reflector (20) comprising a parabolic trough having an interior surface comprising a longitudinally extending parabolic first reflective surface (22);

mounting said light source inside said primary reflector so that said first reflective surface receives light directly from the light source;

emitting a fan-shaped beam of light (26) from the primary reflector, the beam of light including light reflected from the first reflective surface and light directly from the light source;

providing a secondary reflector (30) spaced from the primary reflector and having a second reflective surface (32) that is arranged to intersect and reflect the fan-shaped beam of light, the second reflective surface having a shape that corresponds to the fan-shaped beam of light; and the second reflective surface displaying a band of light (36) whose shape corresponds to the shape of the second reflective surface.

16. The method of claim 15, further comprising selecting a size and shape of the second reflective surface based on the size and shape of the band of light and selecting a size and shape of the first reflective surface based on the selected size and shape of the second reflective surface.

\* \* \* \* \*